United States Patent
Nose et al.

(10) Patent No.: US 12,196,230 B2
(45) Date of Patent: Jan. 14, 2025

(54) CONTROL DEVICE AND HYDRAULIC SYSTEM INCLUDING THE SAME

(71) Applicant: KAWASAKI JUKOGYO KABUSHIKI KAISHA, Kobe (JP)

(72) Inventors: Tomomichi Nose, Kobe (JP); Hayato Kawasaki, Kobe (JP); Hideyasu Muraoka, Kobe (JP); Nobuyuki Kinoshita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 312 days.

(21) Appl. No.: 17/906,319

(22) PCT Filed: Feb. 18, 2021

(86) PCT No.: PCT/JP2021/006107
§ 371 (c)(1),
(2) Date: Sep. 14, 2022

(87) PCT Pub. No.: WO2021/186998
PCT Pub. Date: Sep. 23, 2021

(65) Prior Publication Data
US 2023/0099778 A1 Mar. 30, 2023

(30) Foreign Application Priority Data
Mar. 17, 2020 (JP) .................................. 2020-046637

(51) Int. Cl.
*F15B 13/04* (2006.01)
*F15B 11/028* (2006.01)
(Continued)

(52) U.S. Cl.
CPC ........ *F15B 13/0402* (2013.01); *F15B 11/028* (2013.01); *F15B 11/08* (2013.01);
(Continued)

(58) Field of Classification Search
CPC ........ F15B 2211/3144; F15B 2211/329; F15B 13/0402; F15B 2211/40515;
(Continued)

(56) References Cited

U.S. PATENT DOCUMENTS 5,829,335 A * 11/1998 Ewald ................... F15B 21/087
91/363 R
10,519,988 B2 * 12/2019 Schneider ............... F15B 13/01
(Continued)

FOREIGN PATENT DOCUMENTS

JP 2003167604 A 6/2003

*Primary Examiner* — Atif H Chaudry
(74) *Attorney, Agent, or Firm* — Alleman Hall & Tuttle LLP

(57) ABSTRACT

This control device controls movement of a valve body of a valve device included in a hydraulic system and includes: a stroke command calculator that calculates a stroke command for the valve body on the basis of an opening command that is input to the stroke command calculator; an observer that estimates, on the basis of the stroke command, a dynamic deviation of a stroke of the valve body that corresponds to the stroke command; and a flow force estimator that estimates, on the basis of the stroke command and the dynamic deviation, a flow force acting on the valve body. The stroke command calculator calculates the stroke command on the basis of the flow force in addition to the opening command.

6 Claims, 3 Drawing Sheets

(51) Int. Cl.
    *F15B 11/08*     (2006.01)
    *F15B 21/08*     (2006.01)
    *G05B 11/36*     (2006.01)

(52) U.S. Cl.
    CPC .............. *F15B 21/08* (2013.01); *G05B 11/36* (2013.01); *F15B 2211/3144* (2013.01); *F15B 2211/329* (2013.01); *F15B 2211/40515* (2013.01); *F15B 2211/6336* (2013.01); *F15B 2211/6654* (2013.01); *F15B 2211/75* (2013.01)

(58) Field of Classification Search
    CPC ...... F15B 2211/6336; F15B 2211/6654; F15B 2211/75; F15B 11/028; F15B 21/08; F15B 11/08; F15B 11/042; F15B 13/0433; F15B 2211/30525; F15B 2211/327; F15B 2211/351; F15B 2211/6309; F15B 2211/6313; F15B 2211/6346; F15B 2211/665; F15B 2211/6656; F15B 2211/7053; G05B 11/36
    See application file for complete search history.

(56) References Cited

U.S. PATENT DOCUMENTS

| | | | |
|---|---|---|---|
| 2021/0254637 A1* | 8/2021 | Eriksson | F15B 13/0402 |
| 2021/0277630 A1* | 9/2021 | Yumoto | E02F 9/2296 |
| 2022/0120295 A1* | 4/2022 | Ueda | E02F 9/22 |

\* cited by examiner

CONTROL DEVICE AND HYDRAULIC SYSTEM INCLUDING THE SAME

TECHNICAL FIELD

The present invention relates to a control device that controls movement of a valve body of a valve device included in a hydraulic system, and a hydraulic system including the control device.

BACKGROUND ART

A hydraulic system includes a control device. The control device controls movement of a valve body of a valve device, for example, a spool of a spool valve, in the hydraulic system. Known examples of such a control device include the control device disclosed in Patent Literature (PTL) 1. The control device disclosed in PTL 1 performs feedback control on a command current on the basis of a spool position detected by a sensor circuit.

CITATION LIST

Patent Literature

PTL 1: Japanese Laid-Open Patent Application Publication No. 2003-167604

SUMMARY OF INVENTION

Technical Problem

The control device disclosed in PTL 1 includes the sensor circuit in order to perform the feedback control, but it is preferable that the movement of the valve body can be controlled even when the spool position is not detected. For example, there is a method for estimating a stroke distance of the valve body from an input value such as an operation command. In the method for estimating a stroke distance, the stroke distance is estimated primarily on the basis of only the static equilibrium conditions for the spool. However, estimating the stroke distance on the basis of only the static equilibrium conditions for the spool leads to an increase in the stroke distance estimation error. Therefore, there is a demand for more accurate control of the motion of the valve body.

Thus, an object of the present invention is to provide a control device capable of controlling movement of a valve body with more accuracy.

Solution to Problem

A control device according to the present invention controls movement of a valve body of a valve device included in a hydraulic system and includes: a stroke command calculator that calculates a stroke command for the valve body on the basis of an opening command that is input to the stroke command calculator; an observer that estimates, on the basis of the stroke command calculated by the stroke command calculator, a dynamic deviation of a stroke of the valve body that corresponds to the stroke command; and a flow force estimator that estimates, on the basis of the stroke command calculated by the stroke command calculator and the dynamic deviation estimated by the observer, a flow force acting on the valve body. The stroke command calculator calculates the stroke command on the basis of the flow force estimated by the flow force estimator in addition to the opening command that is input to the stroke command calculator.

According to the present invention, a stroke command is calculated on the basis of a flow force that is not referred to under the static equilibrium conditions, and thus a more accurate stroke command can be calculated. This enables more accurate control of the movement of the valve body.

A hydraulic system according to the present invention includes: a hydraulic pump that discharges an operating fluid to be supplied to an actuator; a valve device that adjusts a flow rate of the operating fluid to be supplied to the actuator; and the control device described above.

According to the present invention, it is possible to provide a hydraulic system in which the movement of a valve body is controlled with more accuracy.

Advantageous Effects of Invention

The present invention enables more accurate control of movement of a valve body.

The above object, other objects, features, and advantages of the present invention will be made clear by the following detailed explanation of preferred embodiments with reference to the attached drawings.

DESCRIPTION OF EMBODIMENTS

Hereinafter, a hydraulic system 1 and a control device 17 according to an embodiment of the present invention will be described with reference to the aforementioned drawings. Note that the concept of directions mentioned in the following description is used for the sake of explanation; the orientations, etc., of elements according to the present invention are not limited to these directions. Each of the hydraulic system 1 and the control device 17 described below is merely one embodiment of the present invention. Thus, the present invention is not limited to the following embodiment and may be subject to addition, deletion, and alteration within the scope of the essence of the present invention.

Figure 1:
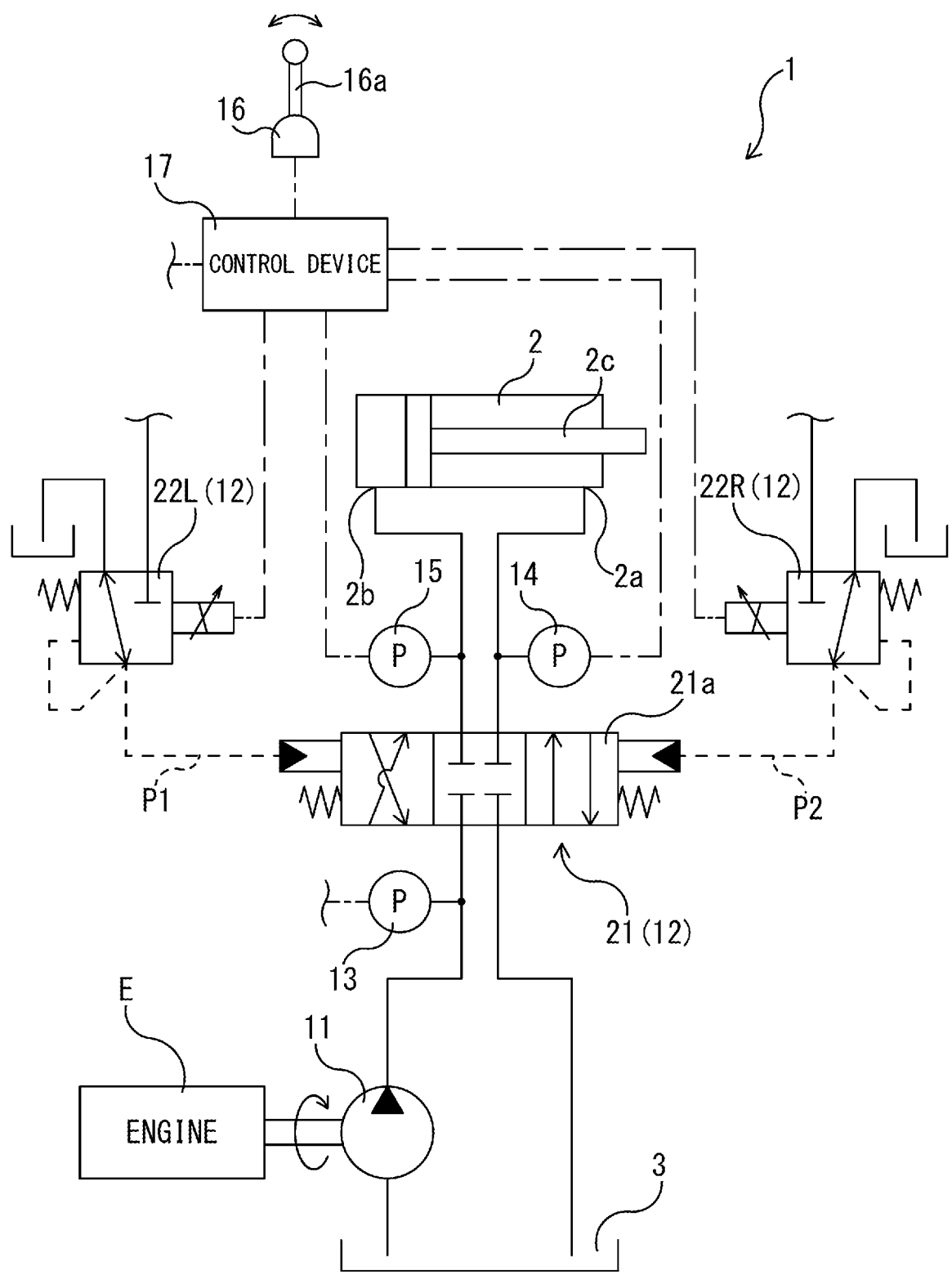
FIG. 1 is a hydraulic circuit diagram showing a hydraulic system according to an embodiment of the present invention.
Figure 2:
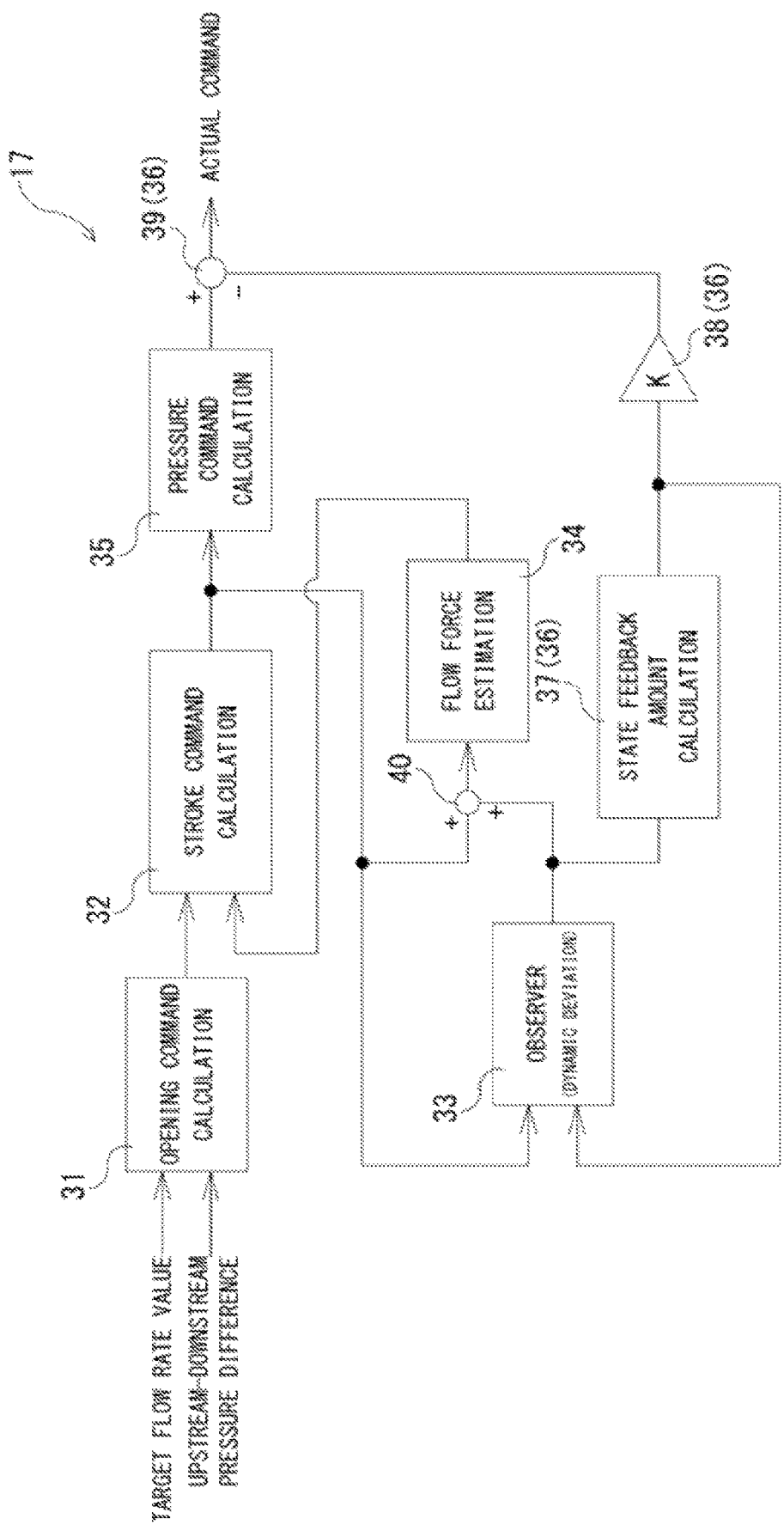
FIG. 2 is a block diagram of a control device included in the hydraulic system shown in FIG. 1.

Construction equipment includes a hydraulic actuator and the hydraulic system 1 in order to move elements. The hydraulic actuator is a hydraulic cylinder 2 such as that shown in FIG. 1, for example. The hydraulic cylinder 2 is attached so as to correspond to the elements of the construction equipment. The hydraulic cylinder 2 can expand and contract to actuate the corresponding elements. More specifically, the hydraulic cylinder 2 includes a rod-end port 2a and a head-end port 2b. As a result of the supply of an operating fluid to each of the ports 2a, 2b, the hydraulic cylinder 2 expands and contracts.

The hydraulic system 1 is capable of supplying the operating fluid to the hydraulic cylinder 2. The hydraulic system 1 is capable of expanding and contracting the hydraulic cylinder 2 by supplying the operating fluid to the hydraulic cylinder 2. The hydraulic system 1 having such a function includes a hydraulic pump 11, a valve device 12, three pressure sensors 13 to 15, an operation device 16, and a control device 17, for example.

The hydraulic pump 11 is capable of discharging the operating fluid. More specifically, the hydraulic pump 11 is connected to a drive source. The drive source is an engine E or an electric motor. In the present embodiment, the drive source is the engine E. The hydraulic pump 11 is rotationally driven by the engine E to discharge the operating fluid. Note that the hydraulic pump 11 is a swash plate pump or a bent axis pump in the present embodiment.

The valve device 12 is interposed between the hydraulic pump 11 and the hydraulic cylinder 2. The valve device 12 can control, according to a motion command that is input thereto, the direction and flow rate of the operating fluid flowing from the hydraulic pump 11 to the hydraulic cylinder 2. Specifically, the valve device 12 is capable of switching the flow direction of the operating fluid so as to direct the operating fluid to one of the two ports 2a, 2b of the hydraulic cylinder 2, and also capable of blocking the flow of the operating fluid to the two ports 2a, 2b. More specifically, the valve device 12 is an electronically controlled spool valve. In other words, the valve device 12 includes a directional control valve 21 and two electromagnetic proportional control valves 22L, 22R.

The directional control valve 21 is connected to the hydraulic pump 11, the rod-end port 2a and the head-end port 2b of the hydraulic cylinder 2, and a tank 3. The directional control valve 21 is capable of switching the connection between the hydraulic pump 11, the rod-end port 2a and the head-end port 2b of the hydraulic cylinder 2, and the tank 3 (specifically, allowing or blocking the flow between these elements). Thus, the flow from the hydraulic pump 11 to the hydraulic cylinder 2 is switched. By changing the flow in this manner, the directional control valve 21 can expand and contract the hydraulic cylinder 2. Furthermore, the directional control valve 21 is capable of adjusting the size of the opening thereof, that is, the opening degree, for when the hydraulic pump 11 and the hydraulic cylinder 2 are in communication. This makes it possible to adjust the flow rate of the operating fluid flowing to the hydraulic cylinder 2. In other words, it is possible to adjust a speed at which the hydraulic cylinder 2 expands and contracts.

More specifically, the directional control valve 21 includes a spool 21a. The spool 21a is capable of switching the connection state by changing the position thereof (in other words, the stroke distance thereof). This means that the spool 21a is capable of connecting the hydraulic pump 11 to each of the rod-end port 2a and the head-end port 2b according to the position of the spool 21a. Furthermore, the spool 21a is capable of adjusting the opening degree according to the stroke distance (or the position) of the spool 21a. This makes it possible to adjust the flow rate of the operating fluid flowing to the hydraulic cylinder 2. The spool 21a having such a function receives pilot pressures P1, P2 opposing each other and moves to a position corresponding to the pressure difference between the two pilot pressures P1, P2.

The first electromagnetic proportional control valve 22L and the second electromagnetic proportional control valve 22R, each of which is one example of the electromagnetic proportional valve, output the first pilot pressure P1 and the second pilot pressure P2, respectively, which correspond to signals (in the present embodiment, electric currents or voltages) that are input to the first and second electromagnetic proportional control valves 22L, 22R. The first pilot pressure P1 and the second pilot pressure P2 that are output are brought to the spool 21a. More specifically, the first and second electromagnetic proportional control valves 22L, 22R are connected to a pilot pump not shown in the drawings. The first and second electromagnetic proportional control valves 22L, 22R adjust the operating fluid discharged from the pilot pump so that the pressure of the operating fluid corresponds to the signals, and then output the operating fluid to the spool 21a.

The three pressure sensors 13 to 15 detect hydraulic pressures upstream and downstream of the directional control valve 21. More specifically, the first pressure sensor 13 is provided corresponding to a channel connecting the directional control valve 21 and the hydraulic pump 11. The second pressure sensor 14 is provided corresponding to a channel connecting the directional control valve 21 and the rod-end port 2a of the hydraulic cylinder 2. The third pressure sensor 15 is provided corresponding to a channel connecting the directional control valve 21 and the head-end port 2b. Each of the pressure sensors 13 to 15 detects the hydraulic pressure of the corresponding channel. Subsequently, each of the pressure sensors 13 to 15 outputs the detected hydraulic pressure to the control device 17.

The operation device 16 outputs an operation command to the control device 17 in order to actuate the hydraulic cylinder 2. The operation device 16 is an operation valve or an electric joystick, for example. More specifically, the operation device 16 includes an operation lever 16a, which is one example of the operation tool. The operation lever 16a is configured in such a manner that an operator can operate the operation lever 16a. For example, the operation lever 16a is configured to be able to swing. The operation device 16 outputs, to the control device 17, the operation command that corresponds to the amount of operation (in the present embodiment, the amount of swing) of the operation lever 16a.

The control device 17 is connected to the pressure sensors 13 to 15, two electromagnetic proportional control valves 22L, 22R, and the operation device 16. The control device 17 controls the motion of the spool 21a of the valve device 12 according to the operation command from the operation device 16. More specifically, the control device 17 calculates the motion command on the basis of the results of detection of the pressure sensors 13 to 15 and the operation command from the operation device 16. The motion command is a pressure command (more specifically, an actual command to be described later) for controlling the motion of the spool 21a of the valve device 12. The control device 17 generates, on the basis of the actual command, the signals to be output to the electromagnetic proportional control valves 22L, 22R. When the generated signals are output to the electromagnetic proportional control valves 22L, 22R, the pilot pressures P1, P2, each of which corresponds to the actual command, are output from the electromagnetic proportional control valves 22L, 22R. Thus, the motion of the spool 21a of the valve device 12 is controlled according to the operation command.

Control device 17 will be described in more detail below. The control device 17 obtains a target flow rate value and an upstream-downstream pressure difference of the valve device 12 in order to calculate the motion command. The target flow rate value is a target value of the flow rate of the operating fluid flowing to the hydraulic cylinder 2. In the present embodiment, the control device 17 sets the target flow rate value on the basis of the operation command from the operation device 16. Note that in order to calculate the motion command, the target flow rate value is set in the present embodiment, but a target pressure value may be set instead. Meanwhile, the upstream-downstream pressure difference of the valve device 12 (that is, the upstream-downstream pressure difference of the directional control valve 21) is the difference between the pressures upstream and downstream of the valve device 12 (more specifically, the directional control valve 21) in the channel connecting the hydraulic pump 11 and the hydraulic cylinder 2 via the valve device 12. The control device 17 obtains the upstream-downstream pressure difference of the directional control valve 21 on the basis of the signals from the three pressure sensors 13 to 15. Furthermore, in order to calculate the motion command, the control device 17 includes an opening command calculator 31, a stroke command calculator 32, an observer 33, a flow force estimator 34, a pressure command calculator 35, and a state feedback controller 36.

The opening command calculator 31 calculates an opening command for the directional control valve 21 on the basis of the obtained target flow rate value and the obtained upstream-downstream pressure difference of the directional control valve 21. The opening command indicates an opening degree at which the directional control valve 21 is to be open. In the present embodiment, the opening command calculator 31 calculates an opening degree at which the operating fluid can flow from the directional control valve 21 to the hydraulic cylinder 2 at a flow rate having the target flow rate value.

The stroke command calculator 32 calculates a stroke command for the spool 21a on the basis of the opening command calculated by the opening command calculator 31. The stroke command indicates a stroke distance the spool 21a is to travel so that the opening degree of the directional control valve 21 corresponds to the opening command. More specifically, in view of a flow force, which is a non-linear element, the stroke command calculator 32 calculates the stroke distance the spool 21a is to travel.

More specifically, the stroke command calculator 32 obtains the flow force estimated by the flow force estimator 34 to be described later (namely, a flow force estimate). Note that the flow force is a load acting on the spool 21a when the operating fluid flows from the hydraulic pump 11 to the hydraulic cylinder 2 via the directional control valve 21. In the present embodiment, the spool 21a receives, from the operating fluid flowing in the directional control valve 21, the flow force acting in a direction in which the opening of the directional control valve 21 is closed. The stroke command calculator 32 calculates the stroke command on the basis of the flow force estimate and the opening command. This makes it possible to eliminate non-linear elements from a mathematical model that defines the motion of the spool 21a. Note that the opening command referred to by the stroke command calculator 32 does not necessarily need to be the command calculated by the opening command calculator 31. For example, the operation command per se from the operation device 16 may be the opening command.

The observer 33 estimates the state quantity of the spool 21a on the basis of the stroke command calculated by the stroke command calculator 32. In the present embodiment, the state quantity estimated by the observer 33 is a vector including a dynamic deviation and the value of differential of the dynamic deviation. The dynamic deviation is the stroke distance of the spool 21a, which varies depending on a dynamic load that is a load (for example, an inertial force, a viscous resistance, or Coulomb friction) that is produced due to the movement of the spool 21a when the spool 21a is moved in response to the stroke command.

More specifically, in order to estimate the state quantity of the spool 21a, the observer 33 functions as follows. The observer 33 calculates an inertial force and a viscous resistance on the basis of the stroke command calculated by the stroke command calculator 32. Furthermore, predetermined Coulomb friction is set in the observer 33. Moreover, the observer 33 has a predetermined linear state equation. Therefore, the observer 33 estimates the state quantity of the spool 21a on the basis of the linear state equation and the dynamic loads that are the estimated inertial force and the viscous resistance and the Coulomb friction.

The flow force estimator 34 calculates a flow force on the basis of the dynamic deviation included in the state quantity estimated by the observer 33. More specifically, the flow force estimator 34 estimates the flow force on the basis of the estimated stroke distance of the spool 21a. The estimated stroke distance of the spool 21a is the estimated value of the actual stroke distance (namely, the actual stroke distance) of the spool 21a. In other words, the estimated stroke distance, which is the estimated value of the stroke distance, is a value obtained by displacing the stroke command by the dynamic deviation. Therefore, the estimated stroke distance of the spool 21a is calculated by a stroke adder 40 adding up the dynamic deviation and the stroke distance obtained. The flow force estimator 34 estimates the flow force on the basis of the estimated stroke distance calculated by the stroke adder 40. In the present embodiment, an estimating equation is set in the flow force estimator 34 in order to estimate the flow force. The flow force estimator 34 calculates the flow force on the basis of said estimating equation and the estimated stroke distance.

The pressure command calculator 35, which is one example of the motion command calculator, calculates the pressure command on the basis of the stroke command calculated by the stroke command calculator 32. The pressure command is command values of the pilot pressures P1, P2 to be output from the electromagnetic proportional control valves 22L, 22R in order to move the spool 21a in response to the stroke command. This means that the pressure command calculator 35 calculates the command values of the pilot pressures P1, P2 (namely, the pressure commands) in response to the stroke command.

The state feedback controller 36 performs, on the basis of the state quantity estimated by the observer 33, state feedback on the pressure command calculated by the pressure command calculator 35. More specifically, the state feedback controller 36 includes a state feedback amount calculation portion 37, a pressure conversion portion 38, and an actual command calculation portion 39.

The state feedback amount calculation portion 37 calculates a state feedback amount on the basis of the state quantity estimated by the observer 33. The state feedback amount is a value calculated in order to perform state feedback control on the pressure command. More specifically, the state feedback amount is a dynamic load corresponding to the dynamic deviation of the spool 21a. In the present embodiment, the state feedback amount calculation portion 37 calculates a state feedback amount as the inner product of a gain vector and the state quantity estimated by the observer 33.

The pressure conversion portion 38 performs pressure conversion on the state feedback amount. In the present embodiment, the pressure conversion portion 38 performs a calculation on the basis of the state feedback amount calculated by the state feedback amount calculation portion 37. More specifically, the pressure conversion portion 38 multiplies the state feedback amount calculated by the state feedback amount calculation portion 37 by a gain K. Thus, the state feedback amount is converted into a pressure value.

The actual command calculation portion 39 calculates an actual command, which is a pressure command to be actually output to each of the electromagnetic proportional control valves 22L, 22R, on the basis of the pressure command calculated by the pressure command calculator 35 and the pressure value resulting from the pressure conversion at the pressure conversion portion 38, that is, a converted feedback amount. The actual command is a command obtained by performing the state feedback control on the pressure command. In the present embodiment, the actual command calculation portion 39 calculates the actual command by subtracting the converted feedback amount from the pressure command. In this manner, the state feedback controller 36 performs the state feedback control on the pressure command.

The observer 33 plays a role in estimating the state quantity of the directional control valve 21 when the state feedback control is performed on the pressure command. Therefore, the observer 33 obtains the aforementioned state feedback amount in addition to the stroke command. The observer 33 estimates the state quantity including the dynamic deviation on the basis of the linear state equation using the stroke command, the state feedback amount, the Coulomb friction, and the like as input values. Thus, the state quantity can be estimated in the observer 33 which has a model with less error for the hydraulic system 1. In other words, an accurate dynamic deviation can be estimated in the observer 33. This enables more accurate control of the movement of the spool 21a.

Figure 3:
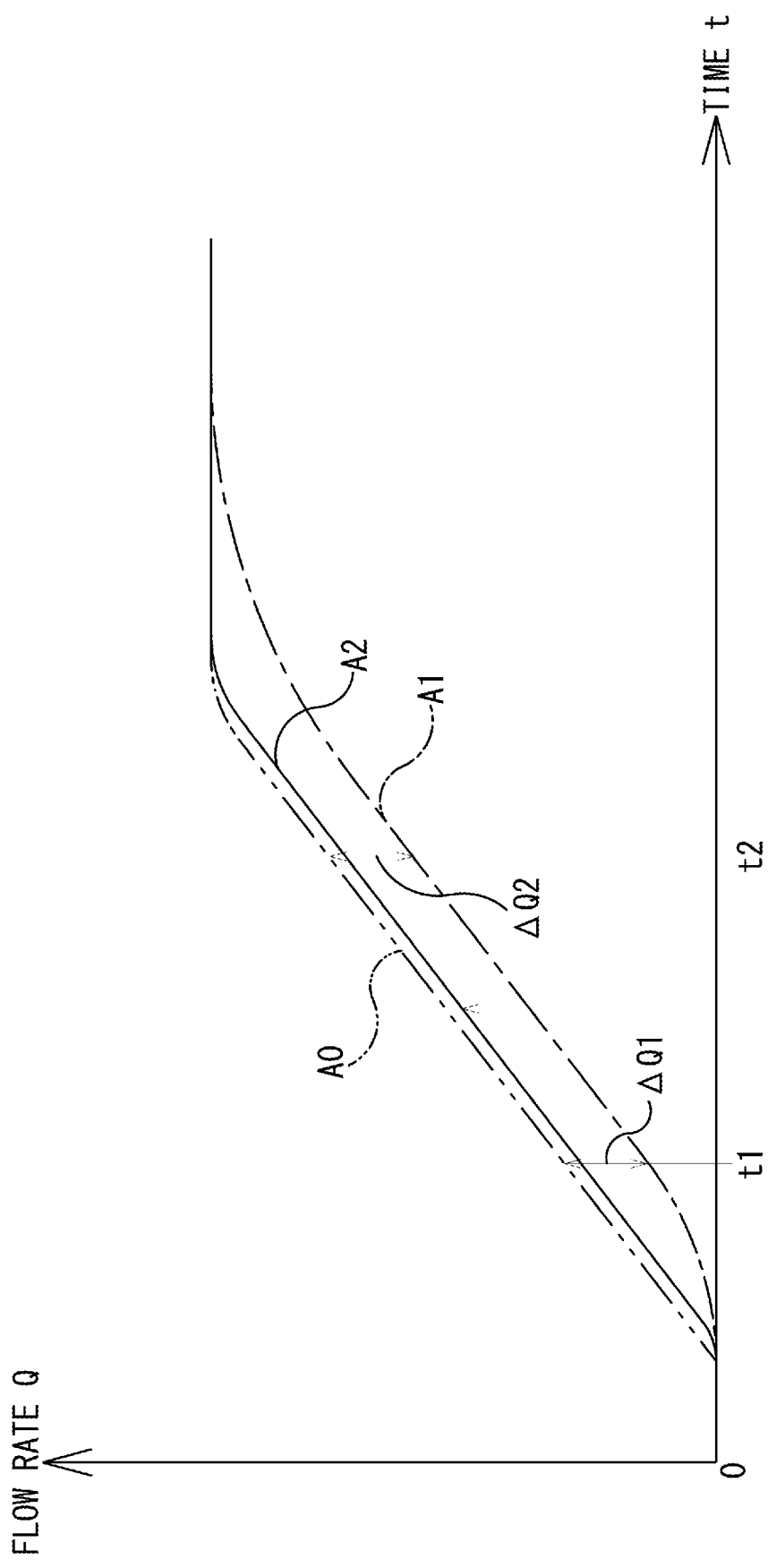
FIG. 3 is a graph showing temporal changes in a flow rate of an operating fluid flowing through a valve device in the hydraulic system shown in FIG. 1.

The control device 17 having such a function performs the following control when the operation lever 16a of the operation device 16 is operated. Note that in the present embodiment, the operation lever 16a is operated so that the operating fluid is supplied from the hydraulic pump 11 to the hydraulic cylinder 2 at the temporally changing flow rate indicated by a double-dot-dashed line A0 of the graph shown in FIG. 3. In other words, on the basis of the operation command from the operation device 16, the control device 17 sets a target flow rate value such as that indicated by the double-dot-dashed line A0 shown in FIG. 3. Furthermore, the control device 17 calculates the upstream-downstream pressure difference of the directional control valve 21 on the basis of the pressures detected by the three pressure sensors 13 to 15.

Next, in the control device 17, the opening command calculator 31 calculates the opening command on the basis of the target flow rate value and the upstream-downstream pressure difference of the directional control valve 21. The stroke command calculator 32 calculates the stroke command on the basis of the opening command and the flow force estimate. The flow force estimate is estimated on the basis of the dynamic deviation included in the state quantity estimated by the observer 33. Specifically, the observer 33 calculates the state quantity on the basis of the stroke command calculated in advance and the dynamic load estimated in advance (in the present embodiment, the immediately preceding stroke command and dynamic load). The flow force estimator 34 calculates the flow force on the basis of the dynamic deviation included in the state quantity. More specifically, the flow force estimator 34 estimates the flow force on the basis of the estimated stroke distance obtained by adding the dynamic deviation to the stroke command. The flow force estimated in this manner is used for the stroke command to be calculated later.

Furthermore, in the control device 17, the pressure command calculator 35 calculates the pressure command on the basis of the stroke command. According to the pressure command, the spool 21a travels only a distance corresponding to the dynamic deviation for a desired stroke distance in order to open a port at a desired opening degree. Therefore, the flow rate of the operating fluid actually flowing to the hydraulic cylinder 2 according to the pressure command changes with time as indicated by a dot-dashed line A1 in FIG. 3. Specifically, the flow rate of the operating fluid actually flowing to the hydraulic cylinder 2 is less than the target flow rate value at time t1 in FIG. 3 by AQ1 and is less than the target flow rate value at time t2 in FIG. 3 by AQ2. Thus, in the control device 17, the state feedback controller 36 performs the state feedback control on the pressure command.

Specifically, the state feedback amount calculation portion 37 calculates the state feedback amount on the basis of the dynamic deviation. Subsequently, the pressure conversion portion 38 performs the pressure conversion on the state feedback amount. Note that the state feedback amount is an amount that increases the flow rate at time t1 in FIG. 3 by AQ1 and is an amount that increases the flow rate at time t2 in FIG. 3 by AQ2. Subsequently, the actual command calculation portion 39 calculates an actual command on the basis of the pressure command and the state feedback amount in order to remove a pressure corresponding to the dynamic deviation from the pressure command.

The control device 17 causes the electromagnetic proportional control valves 22L, 22R to output the pilot pressures P1, P2, each of which corresponds to the calculated actual command. This makes it possible to move the spool 21a of the directional control valve 21 to a position corresponding to the operation amount of the operation lever 16a. In other words, the control device 17 controls the movement of the spool 21a. Thus, the flow rate of the operating fluid actually flowing to the hydraulic cylinder 2 can be adjusted to approach the target flow rate value (refer to a solid line A2 of the graph shown in FIG. 3).

In the control device 17 in the hydraulic system 1 configured as described above, the stroke command calculator 32 calculates the stroke command on the basis of the opening command and the flow force estimate. In other words, the stroke command is calculated on the basis of a flow force that is not referred to when the stroke command is calculated under the static equilibrium conditions. Therefore, a more accurate stroke command can be calculated in order to open the directional control valve 21 at an opening degree corresponding to the opening command. This enables more accurate control of the movement of the spool 21a.

Furthermore, in order to calculate the stroke command, the control device 17 in the hydraulic system 1 takes the flow force estimate into consideration and eliminates non-linear elements from a mathematical model that defines the motion of the spool 21a. This allows the control device 17 to perform the state feedback on the pressure command on the basis of the dynamic deviation calculated from the stroke command. By performing the state feedback in this manner, it is possible to minimize the delay in the stroke of the spool 21a at the time of a transient response. Specifically, it is possible to minimize the delay in the stroke of the spool 21a that is due to the dynamic deviation thereof at the time of a transient response. This enables yet more accurate control of the movement of the spool 21a.

Furthermore, since the control device 17 in the hydraulic system 1 performs the state feedback control on the basis of the dynamic deviation of the spool 21a, more accurate sensor-less state feedback control is possible as compared to the case where the state feedback control based on the stroke distance is performed. In other words, the use of the dynamic deviation, the absolute amount of which is smaller than that of the stroke distance, makes it possible to reduce the impact a modeling error has on the state feedback. Therefore, the state feedback control enables more robust control.

Furthermore, in the control device 17, the observer 33 estimates the dynamic deviation on the basis of the last value of the dynamic deviation (more specifically, the state feedback amount) in addition to the stroke command. With this, in the observer 33, a control system model subject to the state feedback control can be incorporated, and a more accurate model of the hydraulic system 1 can be created. Thus, it is possible to estimate the dynamic deviation with more accuracy. Therefore, the movement of the spool 21a can be controlled with more accuracy. Furthermore, since the control device 17 in the hydraulic system 1 estimates the dynamic deviation on the basis of the inertial force, the viscous resistance, and the Coulomb friction acting on the spool 21a, the movement of the spool 21a can be controlled with more accuracy.

OTHER EMBODIMENTS

The hydraulic system 1 according to the present embodiment is applied to construction equipment, but may be applied to an industrial vehicle such as a forklift or industrial equipment such as a press machine. In the hydraulic system 1 according to the present embodiment, only a single directional control valve 21 is connected to the hydraulic pump 11, but two or more directional control valves 21 may be connected thereto in parallel or in series. The hydraulic actuator connected to the directional control valve 21 is not limited to the hydraulic cylinder 2 and may be a hydraulic motor.

Furthermore, in the hydraulic system 1 according to the present embodiment, one example of the hydraulic actuator is the hydraulic cylinder 2, but the hydraulic actuator may be a hydraulic motor. Regarding the type of the hydraulic cylinder 2, the hydraulic cylinder 2 is not limited to a single-rod double-acting cylinder and may be a double-rod cylinder or a single-acting cylinder. Furthermore, the element included in the valve device 12 is not limited to the directional control valve 21 and may be any element as long as the size of the opening thereof can be adjusted using the valve body. The motion command is not necessarily limited to the pressure command and may be an electric current command.

Moreover, in the hydraulic system 1 according to the present embodiment, the spool 21a of the directional control valve 21 moves according to the pilot pressures from the electromagnetic proportional control valves 22L, 22R. However, the method for driving the spool 21a of the directional control valve 21 is not necessarily limited to this method. For example, the spool 21a of the directional control valve 21 may be driven using an electric motor via a direct-acting mechanism. In this case, the motion command is a drive signal for driving the electric motor.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST 1 hydraulic system
11 hydraulic pump
12 valve device
17 control device
21 directional control valve (spool valve)
21a spool (valve body)
22L first electromagnetic proportional control valve
22R second electromagnetic proportional control valve
31 opening command calculator
32 stroke command calculator
33 observer
34 flow force estimator
35 pressure command calculator (motion command calculator)
36 state feedback controller

The invention claimed is:

1. A control device that controls movement of a valve body of a valve device included in a hydraulic system, the control device comprising:
a stroke command calculator that calculates a stroke command for the valve body on the basis of an opening command that is input to the stroke command calculator;
an observer that estimates, on the basis of the stroke command calculated by the stroke command calculator, a dynamic deviation of a stroke of the valve body that corresponds to the stroke command; and
a flow force estimator that estimates, on the basis of the stroke command calculated by the stroke command calculator and the dynamic deviation estimated by the observer, a flow force acting on the valve body, wherein:
the stroke command calculator calculates the stroke command on the basis of the flow force estimated by the flow force estimator in addition to the opening command that is input to the stroke command calculator.

2. The control device according to claim 1, further comprising:
a motion command calculator that calculates, on the basis of the stroke command calculated by the stroke command calculator, a motion command for controlling the movement of the valve body; and
a state feedback controller that performs, on the basis of the dynamic deviation calculated by the observer, state feedback on the motion command calculated by the motion command calculator.

3. The control device according to claim 2, wherein:
the observer estimates the dynamic deviation on the basis of a last value of the dynamic deviation estimated by the observer in addition to the stroke command.

4. The control device according to claim 1, wherein:
the observer calculates, on the basis of the stroke command, an inertial force and a viscous resistance acting on the valve body, and estimates the dynamic deviation of the stroke on the basis of the inertial force, the viscous resistance, and predetermined Coulomb friction acting on the valve body.

5. A hydraulic system comprising:
a hydraulic pump that discharges an operating fluid to be supplied to an actuator;
a valve device that adjusts a flow rate of the operating fluid to be supplied to the actuator; and
the control device according to claim 1.

6. The hydraulic system according to claim 5, wherein:
the valve device includes at least one electromagnetic proportional valve and a spool valve;
the spool valve includes a spool that is the valve body;
the spool travels according to a pilot pressure acting on the spool;
the at least one electromagnetic proportional valve outputs the pilot pressure acting on the spool; and
the control device calculates a pressure command, causes the at least one electromagnetic proportional valve to output the pilot pressure corresponding to the pressure command calculated, and controls movement of the spool, the pressure command being a motion command.

* * * * *